United States Patent [19]
Daugherty et al.

[11] 4,295,005
[45] Oct. 13, 1981

[54] CABLE SPLICE CLOSURE

[75] Inventors: Edgar E. Daugherty; Kenneth W. Jackson; Wesley W. Jones; Naif T. Subh, all of Gwinnett, Ga.

[73] Assignee: Western Electric Company, Inc., New York, N.Y.

[21] Appl. No.: 85,850

[22] Filed: Oct. 17, 1979

[51] Int. Cl.³ .......................................... H02G 15/113
[52] U.S. Cl. ..................................... 174/92; 174/135; 339/103 C; 339/107
[58] Field of Search ............... 339/103 B, 103 C, 106, 339/107; 174/91, 92, 135

[56] References Cited
U.S. PATENT DOCUMENTS

| | | |
|---|---|---|
| 2,419,592 | 4/1947 | Richardson . |
| 2,771,502 | 11/1956 | King et al. ............................. 174/92 |
| 2,891,101 | 6/1959 | Koliss ................................ 174/92 X |
| 3,240,868 | 3/1966 | Ets-Hokin et al. ............... 339/103 B |
| 3,875,325 | 4/1975 | Anderson et al. . |
| 3,889,909 | 6/1975 | Koscik ............................ 339/103 C |

Primary Examiner—Roy N. Envall, Jr.
Attorney, Agent, or Firm—Robert B. Kennedy

[57] ABSTRACT

A telecommunication cable splice closure is disclosed comprising a pair of elongated covers (10) having semi-cylindrical interior walls (12) extending radially about a closure axis (15). Two flat end walls (16) extend from opposed ends of each interior wall normal to the closure axis. A pair of cable clamp supports (22) is provided having annular rims (24) sized to be positioned with the cover interior walls (12) about a cable (46) in flush or in point contact with the end walls (16). Means (52) are also provided for securing the pair of covers (10) together about the clamp supports (22).

7 Claims, 8 Drawing Figures

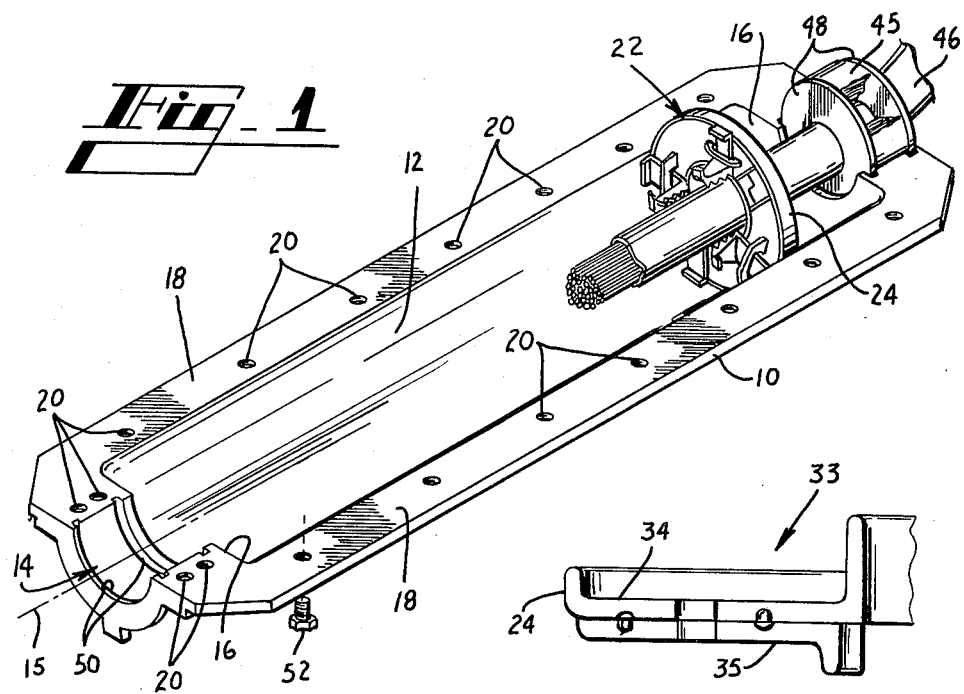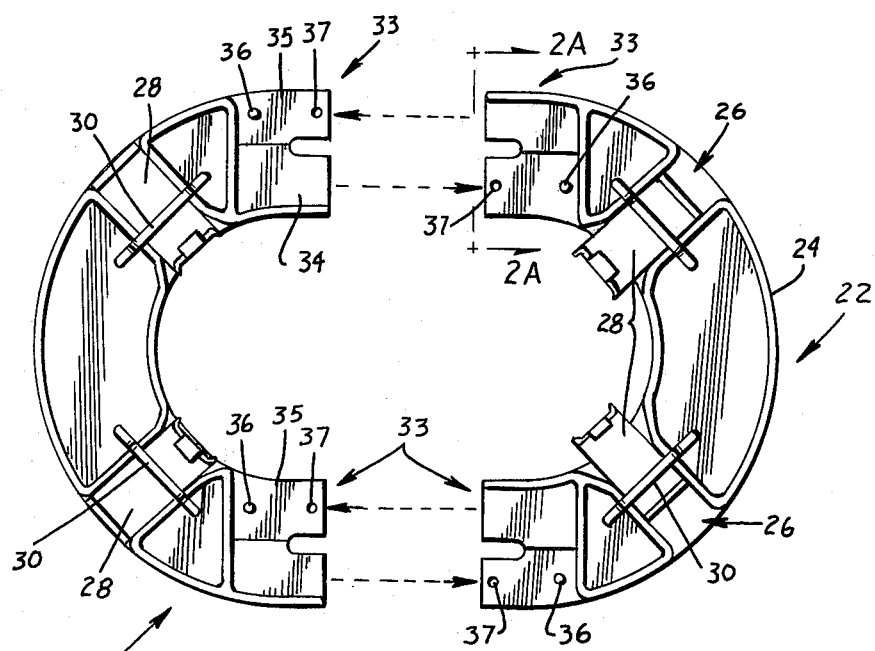

CABLE SPLICE CLOSURE

TECHNICAL FIELD

This invention relates to cable splice closures.

BACKGROUND OF THE INVENTION

Where two ends of a cable such as a telecommunications cable are spliced together the splice area is ordinarily housed within a protective cover known as a splice closure. The design of these closures is dictated by the particular type of cable involved and its environment. For example, closures used with underground cable must ordinarily be watertight and closures for pressurized cables must be pressure tight. A common feature to most closures however is that they must provide some degree of cable strain relief to prevent cable strain from causing splice separation. For aerial cables such strain relief must be quite substantial.

With some closures strain relief is provide merely by the sealant used in sealing closed the end ports through which the cable enters the closure. For example, in U.S. Pat. No. 2,419,592 a moisture-proof cable connector has vinyl resin washers that incorporate a plasticizer sandwiched between two connector surfaces that are converged by rotation of a threaded nut. Upon such convergence the plasticizer is caused to be pressed out of the washers to form an adherent film on a cable which extends therethrough. This film is the only structural element that provides strain relief. U.S. Pat. No. 3,875,325 discloses a waterproof type cable closure having greater strain-relief capability comprised of two hinged shell halves and a tie bar mechanically coupled to a cable at opposed closure mouth ends. The two tie bar to cable connections are made with apparatuses that comprise an inner shoe curved for positioning under the cable sheath to which is attached a threaded stud. This stud extends through an outer plate which overlays the cable jacket and is secured to the tie bar with a nut. Once a splice has been made and the tie bar connected for stiffening purposes, the closure is filled with a filling compound such as petroleum jelly and the two half shells closed.

Strain relief devices of the type described in the last mentioned patent which include a member positioned under the sheath of the cable itself, have found wide usage. For example, the Western Electric Types 20, 21, 30 and 31 closures each use this general type of strain relief apparatus. More specifically, within mating shell halves having unitary end ports through which the cables enter and are sealed to the closure, strain relief is provided by bands that are placed under the cable sheath about the cable core which are squeezed into gripping engagement by the fastening of the shell halves. The bands have ears that engage stop surfaces of the shell upon axial cable movement.

Though cable closures of the type described do provide substantial strain relief they do so with devices that are relatively complex and tedious to install in the field. In forming a splice along a telecommunications line the cable is often oriented such that it enters the closure end ports at a skewed angle to the closure axis. This makes it difficult to align and mount the strain relief devices so that they are properly seated within the closure. If seated improperly, as at a skewed angle with respect to the closure axis, the closure covers may not be closeable or at least not closed properly. It therefore would be desirable to provide a cable closure with strain relief apparatus which could be mounted to a cable within a closure during a splicing operation with ease and expediency and even in those situations where the cable is momentarily biased so as to enter the closure off the closure axis. It is to this task which the present invention is primarily directed.

SUMMARY OF THE INVENTION

In one form of the invention a telecommunication cable splice closure is provided which comprises a pair of elongated covers each having a generally semi-cylindrical interior wall extending radially about a closure axis. From opposed ends of the interior wall extend two flat end walls approximately normally to the closure axis with each end wall defining an opening from which a closure end port extends. A pair of cable clamp supports is provided each having a generally annular rim sized to be positioned within the cover interior walls about a cable in flush contact or in point contact with the end walls. The closure also includes means for securing the pair of covers together about the pair of cable clamp supports. So constructed, during a splicing operation a cable clamp support may temporarily be positioned within the covers in point contact with a cover end wall clamped about a cable entering the closure through an end port at a skewed angle with respect to the closure axis and later be pulled into flush contact with the end wall as the cable is straightened into position along the closure axis.

BRIEF DESCRIPTION OF THE DRAWING

FIG. 1 is a perspective view of a cable splice closure embodying principles of the invention in one preferred form with portions of the closure removed to reveal interior components.

FIG. 2 is an exploded, end elevational view of the cable clamp and clamp support components of the closure shown in FIG. 1.

FIG. 2A is an end view of a portion of the clamp shown in FIG. 2.

DETAILED DESCRIPTION

Figure 3:
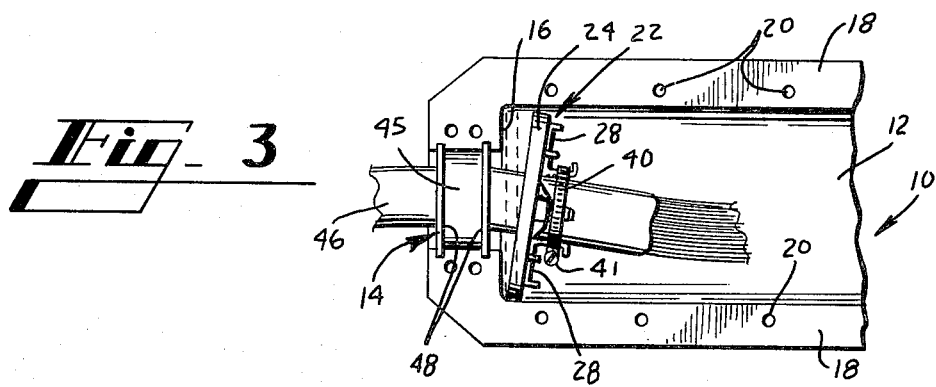
FIG. 3 is a plan view of a portion of the closure type shown in FIG. 1.

Referring now in more detail to the drawing, there is shown in FIGS. 1–3 one of two structurally identical, elongated covers 10 of a telecommunications cable splice closure made of a hot stamped fiberglass reinforced thermoplastic, the other cover being removed for purposes of illustration. The elongated cover 10 has a semi-cylindrical interior wall 12 formed about a closure axis 15 that extends coaxially through two semi-cylindrical end ports 14. Opposed ends of the cylindrical wall 12 unitarily merge with two planar end walls 16. These end walls are oriented substantially normal to the closure axis 15 although they may have a slight degree of draft to facilitate their removal from a mold during cover manufacture. The closure cover is also formed with flat, coplanar flanges 18 that are provided with a set of holes in which threaded, metallic inserts 20 are seated.

With continued reference to FIGS. 1-3 the closure is further seen to include a pair of clamp supports or brackets 22 which are more clearly seen in FIG. 2 to be comprised of two split-ring shaped support sections which, upon assembly, have an annular rim 24. These plastic clamp supports are formed with a set of four radial slots 26 into which metallic, L-shaped, toothed clamping elements 28 are slidably retained under bridges 30 formed unitarily with the supports. Each support section is also seen to have a pair of stepped ends 33. Each end includes a tab or tongue 34 which is stepped or offset from another tab 35 as seen most clearly in FIG. 2A.

The two split-ring shaped support sections are identical whereby one may be inverted and interlocked securely with the other as indicated by the arrows in FIG. 2. For performing this each tab is provided with a rounded protrusion 36 and a mating depression 37 with the protrusion and depression on tabs 35 formed on their obverse sides and those on tabs 34 on the reverse side from that depicted in FIG. 2. These provide snap fits upon section interlock. Since each section is identical it is not necessary for workers in the field to select mating sections since each section will interlock with each other section. The clamps further include a conventional hose clamp with band 40 and screw 41 adapted to be placed and tightened about the toothed clamping elements 28 and cable after the clamp supports have been mounted about the cable and the clamps slid into gripping engagement with the cable as shown in FIG. 3.

In performing a splicing operation cables ends are positioned within a closure cover and their component wires spliced together in a conventional manner. A band of a compressible mastic type sealant 45 is placed about the cable 46 within the end ports 14 between two washers 48 seated in end ports grooves 50. The clamp support sections 22 are interlocked about the cable within the semi-cylindrical cover wall 12 adjacent each end walls 16. The toothed clamping elements 28 are then slid radially inwardly in support slots 26 into gripping engagement with the cable. Should the cable enter the closure at a skewed angle with respect to the closure axis 15, as where temporarily biased from a normal, on-line position down to a work area, the clamp supports may also assume a skewed rather than normal angular relationship with respect to the closure axis. In other words, they may assume a cocked position as shown in FIG. 3 with the support rim 24 being in point contact rather than flush contact with the end wall 16.

The other, unshown cover is then placed over the splice area and the two covers fastened together by bolts 52 threadably received within the inserts 20. Once the closure is released on line the cable 46 may assume a linear orientation. In doing so the cable is likely to assume an orientation within the closure along the closure axis 15. If this occurs the clamp supports will also move from positions in point contact with the end wall to positions in flush contact with the end walls as shown in FIG. 3. If the entire surface of the support facing the adjacent end wall is planar then that entire surface will, of course, become flush against the end wall. Should the support have raised and depressed areas, such as a raised rim, then only the raised area will be in flush contact with the end wall. Thus in this application flush contact is intended to mean as flush as the structured design of the support permits. With the supports now flush against the end wall, as shown in broken lines in FIG. 3, they provide strain relief for the cable since they engage the opposite end walls of the closure and are in gripping engagement with the cable. Consequently, axial forces on the cable are prohibited from being transmitted to the splices themselves.

Figure 4:
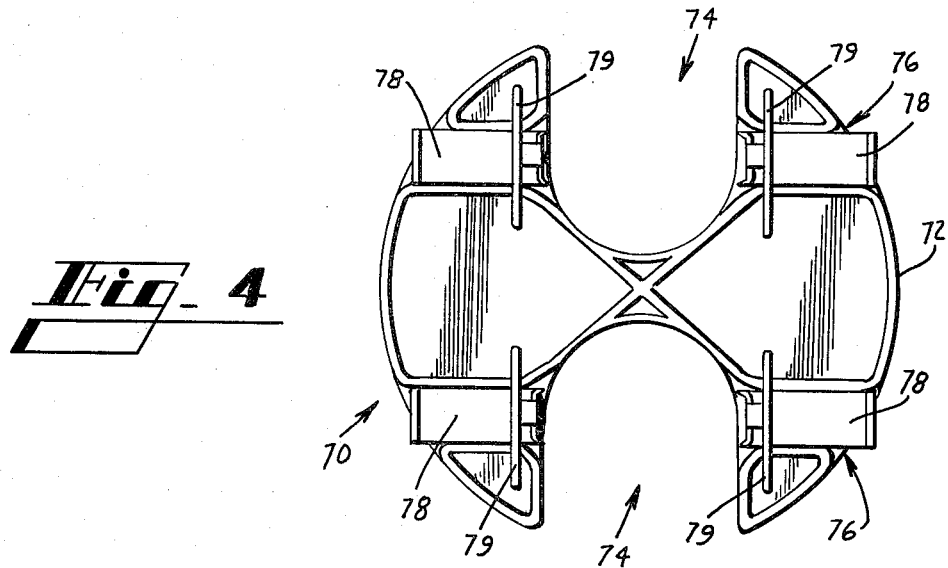
FIG. 4 is a side elevational view of a cable clamp support for use with a dual cable type closure such as that shown in FIG. 5.
Figure 5:
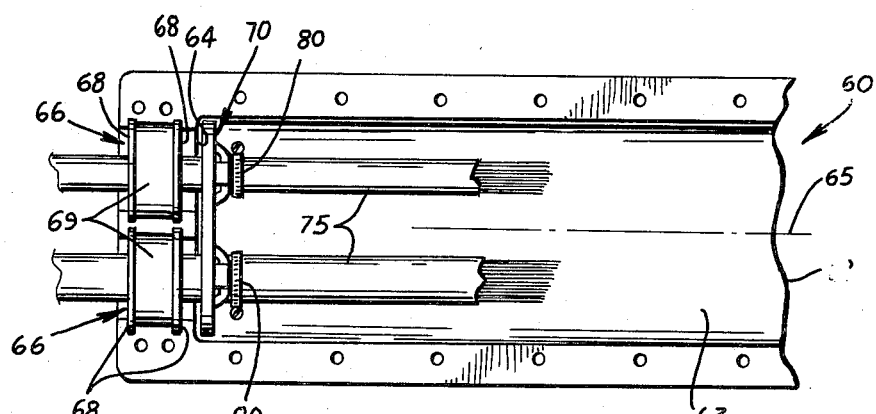
FIG. 5 is a plan view of a portion of a dual cable closure embodying principles of the invention.

With reference next to FIGS. 4 and 5 one cover 62 of a dual cable closure 60 is seen to have an interior semi-cylindrical wall 63 from the ends of which two end walls 64 extend approximately normal to the closure axis 65. Two semi-cylindrical end ports 66 communicate with the interior of the closure through each of the end walls 64. Each end port again has a pair of semi-circular grooves into which washers 68 may be seated sandwiched about a mastic type deformable sealant material 69 positioned about cables 75. In this embodiment the clamp supports 70 are each seen to have a generally annular rim 72 with two large recesses 74 formed therein into which cables 75 may be passed. One surface of the support is formed with four slots 76 into which toothed, L-shaped clamps 78 are slidably retained beneath bridges 79 formed integrally with the support. Again, conventional hose clamps 80 are placed and tightened snuggly about the clamps once they have been slid in gripping engagement with the cables. Here the supports 70 are free also to assume point contact of their rim 72 with the cover end walls 64 while the installer is closing the closure and subsequently be brought into flush contact with the end wall once the cables 75 have moved from a skewed to an on-axis angular relationship with respect to the closure.

Figure 7:
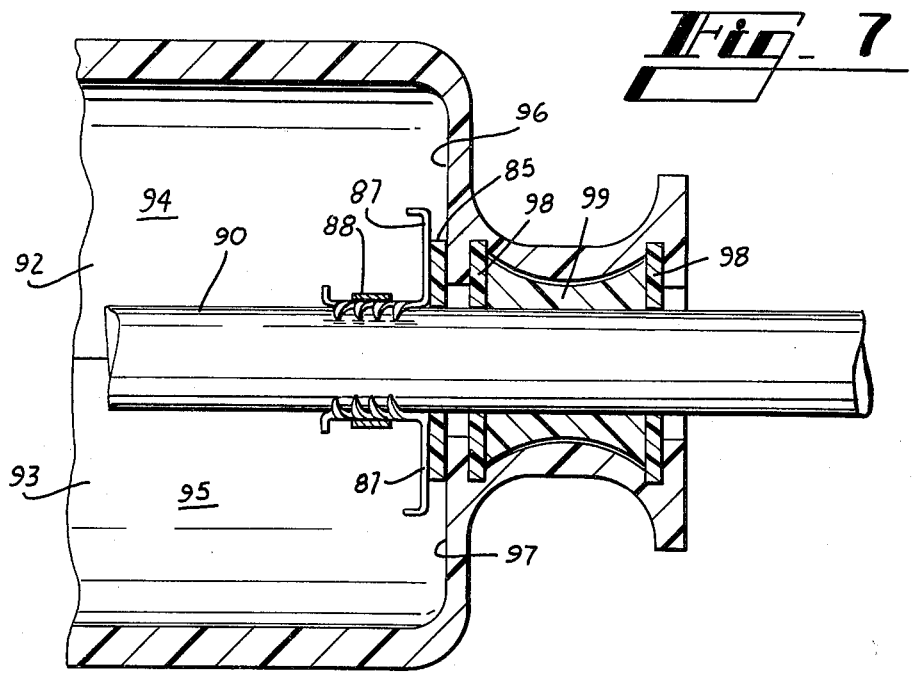
FIG. 7 is a cross-sectional view of a portion of a closure utilizing the clamp and clamp support apparatus shown in FIG. 6.
Figure 6:
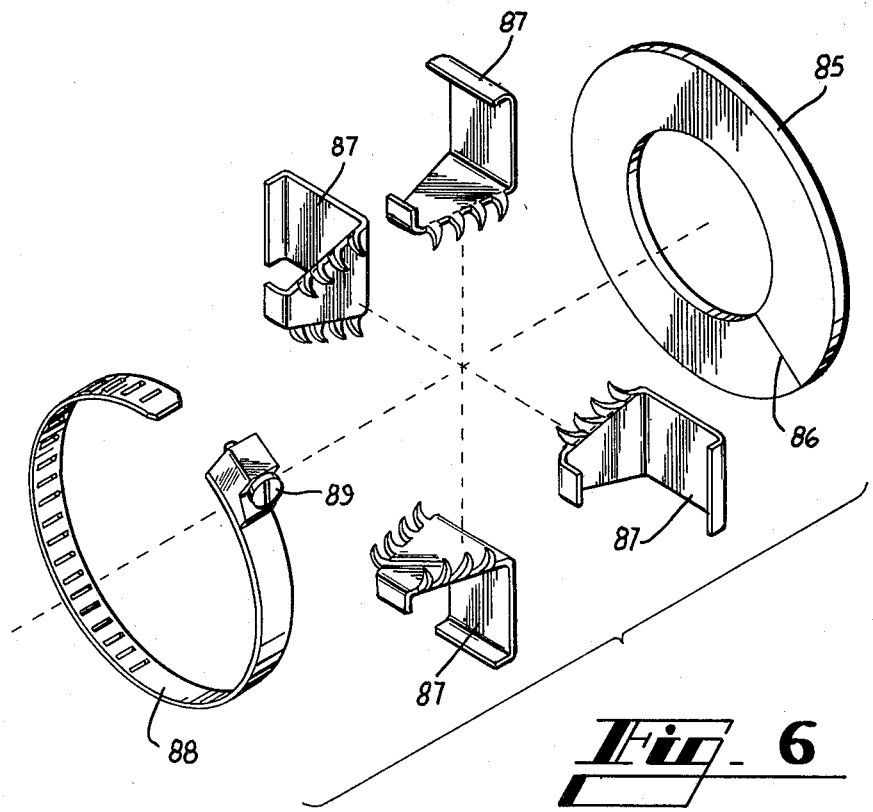
FIG. 6 is an exploded view of a cable clamp and clamp support of an alternative configuration for use with closures as shown in FIG. 7.

Referring next to FIGS. 6 and 7 still another cable splice closure is shown that embodies the present invention. Here the clamp supports include a washer 85 split along line 86 to facilitate mounting flush against which a set of L-shaped toothed clamps 87 may be placed once they have been secured in gripping engagement radially about a cable 90. Band 88 of a hose clamp is then tightened thereabout by rotation of a screw 89. The closure body is seen to be of the same configuration as that shown in FIG. 1 having two closure covers 92 and 93 formed with semi-cylindrical interior walls 94 and 95 from which end walls 96 and 97 extend generally normal to the closure axis. The closure end ports here are also the same and house two washers 98 sandwiched about a roll of mastic sealant material 99. Once again here the clamp support in the form of washer 85 is free to assume a point contact with the end wall 97 initially only later to be brought in flush engagement with the end wall once the cable itself has assumed a position approximately with the axis of the closure.

It should be understood that the just described embodiments merely illustrate principles of the invention in selected, preferred forms. Many modifications, additions and deletions may, of course, be made thereto without departure from the spirit and scope of the invention as set forth in the following claims.

What is claimed is:

1. A telecommunications cable splice closure comprising a pair of elongated covers each having a generally semi-cylindrical interior wall extending radially about a closure axis from opposed ends of which wall two flat end walls extend approximately normally to said closure axis with each end wall defining an opening from which a closure end port extends; a pair of cable clamp supports having generally annular rims sized to be positioned about a cable within said cover interior walls in flush contact or in point contact with said end walls; and means for securing said pair of covers together about said pair of cable clamp supports; whereby during a splicing operation a cable clamp support may temporarily be positioned within the covers in point contact with a cover end wall clamped about a cable entering the closure through an end port at a skewed angle with respect to the closure axis and later be pulled into flush contact with the end wall as the cable is straightened into a position along the closure axis.

2. A cable splice closure in accordance with claim 1 wherein each of said closure covers is of unitary plastic structure.

3. A cable splice closure in accordance with claim 1 wherein each of said cable clamp supports is of a split-ring structure comprised of two generally semi-circular brackets having mutually interlocking stepped tab ends.

4. A cable splice closure in accordance with claim 3 wherein each of said clamp supports is of an identical configuration.

5. A cable splice closure in accordance with claim 1 wherein each of said cable clamp supports is annular and defines a plurality of radial slots spanned by a bridge in which slots toothed clamping elements are slidably retained.

6. A cable splice closure in accordance with claim 1 wherein each of said end walls defines two openings from which two generally semi-cylindrical end port defining walls extend side by side; and wherein each of said cable clamp supports is of a generally disc-shaped configuration having a pair of generally semi-circular recesses formed in radially opposed portions of said annular rim through which a pair of cables may extend side by side.

7. A cable splice closure in accordance with claim 1 wherein each of said cable clamp supports is comprised of a set of L-shaped toothed clamping elements, a band adapted to be tightening about said set of clamping elements when placed in gripping engagement radially about a cable, and a washer sized to be placed with one flat surface in flush contact with the set of clamping elements and an opposed flat surface in contact with said cover end wall.

* * * * *